United States Patent [19]

Otani

[11] Patent Number: 5,568,842
[45] Date of Patent: Oct. 29, 1996

[54] OIL CONTROL UNIT FOR HIGH-PERFORMANCE VEHICLES

[76] Inventor: Akesama Otani, Prestiga Nishiazsbu Building, 4-22-10 Nishiazsbu, Kinatu-ku, Tokyo, 106, Japan

[21] Appl. No.: 300,463

[22] Filed: Sep. 2, 1994

[51] Int. Cl.$^6$ .................................................. F01M 5/00
[52] U.S. Cl. ..................... 184/6.22; 184/6.4; 184/6.6; 184/6.8; 184/6.13; 184/103.2; 184/104.3; 123/196 R; 123/196 AB
[58] Field of Search .............................. 184/6.4, 6.5, 6.6, 184/6.7, 6.8, 6.9, 6.13, 6.22, 18, 103.1, 103.2, 104.3, 105.1, 108; 123/196 R, 196 AB

[56] References Cited

U.S. PATENT DOCUMENTS

| | | | |
|---|---|---|---|
| 2,275,576 | 3/1942 | Ware | 184/104.3 |
| 2,311,069 | 2/1943 | Miller | 123/196 AB |
| 2,373,360 | 4/1945 | Walsh | 184/6.13 |
| 2,389,555 | 11/1945 | Sharples | 184/6.13 |
| 2,796,075 | 6/1957 | Focht | 184/6.4 |
| 3,042,147 | 7/1962 | Hutchings | 184/6.22 |
| 4,913,108 | 4/1990 | Sougawa et al. | 184/103.1 |

FOREIGN PATENT DOCUMENTS

| | | | |
|---|---|---|---|
| 0515326 | 11/1992 | European Pat. Off. | 184/103.1 |
| 0096798 | 4/1991 | Japan | 184/108 |
| 0031612 | 2/1992 | Japan | 184/6.22 |

*Primary Examiner*—Edward K. Look
*Assistant Examiner*—Christopher Verdier
*Attorney, Agent, or Firm*—Laff, Whitesel, Conte & Saret, Ltd.

[57] ABSTRACT

A control unit for circulating lubricating oil to vehicle engine parts comprising an oil tank for collecting lubricating oil; a hydraulic circuit which directs the lubricating oil to the appropriate parts and returns the lubricating oil to the oil tank; an oil pump provided in the hydraulic circuit for circulating the lubricating oil therein; at least one sub-oil tank which can contain an appropriate amount of lubricating oil; at least one hydraulic pipe which connects the sub-oil tank with the hydraulic circuit; and an oil pump which transfers, via the hydraulic pipe, lubricating oil from the sub-oil tank to the hydraulic circuit and from the hydraulic circuit to the sub-oil tank. The unit may also have a cooling bypass for diverting the lubricating oil from the hydraulic circuit to oil cooling means and means for regulating the amount of oil circulated in the hydraulic circuit and in the cooling bypass.

10 Claims, 8 Drawing Sheets

OIL CONTROL UNIT FOR HIGH-PERFORMANCE VEHICLES

BACKGROUND OF THE INVENTION

The present invention relates to a control unit for an oil hydraulic circuit through which lubricating oil flows, such as is used in automobile engines and the like. In particular, the invention relates to a control unit for a hydraulic circuit, which, while the vehicle engine is running, allows the lubricating oil flowing in the circuit to be supplied and removed in a manner that will keep the oil at a certain level, and also allows different types of lubricating oil to be supplied to prevent fuel from diluting the lubricating oil.

Engines, such as automobile engines, include many metallic parts, such as pistons, cylinders, crankshafts, connecting rods, and bearings which slide against one another or rotate. For this reason, a lubricating apparatus is provided for the engine to supply lubricating oil to these metallic parts.

In such a lubricating apparatus, the lubricating oil is collected in an oil pan and is pumped therefrom by an oil pump. After passing through an oil filter which removes foreign matter and an oil pressure regulator which regulates oil pressure, the lubricating oil is transferred by pressure to each of the sliding portions of the engine and returned to the oil pan.

In a wet sump type lubricating apparatus, which has an oil pan mounted directly to the bottom of the engine cylinder block, the lubricating oil is pumped up from an oil suction mouth and ejected onto each of the sliding portions. The oil is then allowed to fall naturally and is returned to the oil pan. In this type of apparatus, the oil pan serves not only as an oil tank which has the necessary capacity for oil circulation, but also as an oil cooler because the bottom of the oil pan is exposed at the lower surface of the car body.

In high performance cars such as racing cars which move rapidly at high speeds, a large acceleration is frequently exerted longitudinally and laterally on the moving car. Therefore, in the wet sump lubricating apparatus which contains collected lubricating oil in the oil pan, the suction mouth may be exposed above the oil surface and suck air, so that the engine may run out of oil. To solve this problem, a dry sump type lubricating apparatus is used. In the dry sump lubricating apparatus, an oil tank which contains collected lubricating oil is separately provided, in addition to an oil recovery sump. The sump is located in the crankcase to recover oil which has been ejected onto the sliding portions of the engine. In addition, a recovery pump, provided in addition to a booster pump, is used to return the lubricating oil from the oil recovery sump to the oil tank.

However, in the above-described wet sump type lubricating apparatus and the dry sump type lubricating apparatus, when the amount of oil in the hydraulic circuit decreases, there is not enough lubricating oil to eject onto the lubricating portions of the engine, so that a suitable oil film cannot be maintained, often resulting in abnormal wear or seizure of the sliding parts. In contrast to this, when there is too much oil in the circuit, excess oil is also supplied to the cylinder and the like, so that the oil may spatter onto the spark plugs to give rise to ignition failure. Accordingly, the oil which circulates through the hydraulic circuit must be kept at the correct level.

In a conventional lubricating apparatus, when the amount of oil decreases by, for example, consumption, it is necessary to stop the car and supply lubricating oil by hand. In particular, when the car moves at a high speed of approximately 160 km/hr, more lubricating oil is consumed as compared to when the car moves at a normal speed of approximately 60 km/hr. Accordingly, cars having a conventional lubricating apparatus cannot be driven at a high speed for a long period of time.

When there is too much circulating lubricating oil, which is caused by supplying too much oil, it is necessary to remove the drain plug by hand from the lubricating apparatus to remove the oil.

In the lubricating apparatus having an oil cooler, when the temperature of the lubricating oil rises, a thermostat operates to divert the oil from the oil circulation path to a bypass which contains an oil cooler. This results in an increase in the total amount of oil needed for circulation, the added increment being equivalent to the capacity of the oil cooler bypass. Consequently, the oil surface of the oil tank rises, often causing ignition failure due to spattering of oil onto the spark plugs. When the oil is diverted to the oil cooler bypass, the oil level of the oil tank is changed. The larger the capacity of the oil cooler, the greater the change in the oil level. Therefore, when installing an air-cooled or oil-cooled engine having a displacement of more than 5000 cc in the car, the cooling capacity of the oil cooler must be increased with the increased displacement of the engine. This results in a greater change in the oil level in the oil tank, which makes it difficult, if not impossible, to use an engine having a high displacement.

On the other hand, for example, as one drives at a speed of approximately 60 km/hr through hot cities, the oil temperature increases, which causes a thermostat to begin cooling the oil by means of the oil cooler. However, when one drives away from such cities and enters highways such as autobahns, driving at a high speed of approximately 210 km/hr in a cool region for a long period of time, the oil will be cooled by the ambient air temperature. In such cases, the thermostat will operate to stop the oil from flowing to the bypass containing the oil cooler. This reduces the total amount of circulating oil, and, in addition, increases the amount of oil consumed due to high-speed driving. This may result in worn and seized sliding parts.

In addition, the lubricating oil expands and contracts with temperature changes. This means that there is a difference in the oil level of the oil tank immediately after the car is started as compared to when it has been driven at a high speed.

Further, since the lubricating oil is also ejected in the cylinder, fuels such as gasoline are mixed in the collected lubricating oil. This dilution with fuel reduces the viscosity of the lubricating oil and makes it impossible to maintain a suitable oil film. This can lead to several engine problems. For example, when one drives at approximately 160 km/hr for about 24 hours, the fuel dilution rate is said to be about 15%. The only thing which can be done to overcome this problem of dilution with fuel is to increase the initial viscosity of the lubricating oil. Increasing the viscosity, however, increases the mixture resistance of the lubricating oil and leads to losses in engine output.

SUMMARY OF THE INVENTION

A first object of the present invention is to make it possible to supply an appropriate amount of lubricating oil to the sliding portions of the engine by controlling the lubricating oil supply, even when the car is running, in accordance with the amount of lubricating oil consumed.

A second object of the present invention is to make it possible to supply an appropriate amount of lubricating oil to the sliding portions of the engine by temporarily removing a portion of the lubricating oil from the oil hydraulic circuit, even when the car is running.

A third object of the present invention is to make it possible to supply lubricating oil of the right viscosity to the sliding portions of the engine by supplying the proper type of lubricating oil, even when the car is running, in accordance with changes in viscosity of the lubricating oil.

According to the present invention, there is provided an oil circulation control unit comprising a main oil sump which collects lubricating oil; a hydraulic circuit which serves to transport the lubricating oil to the parts to be lubricated and return the lubricating oil to the main oil sump; an oil pump provided in the hydraulic circuit, which circulates the lubricating oil in the hydraulic circuit; at least one sub-oil sump which is capable of keeping the right amount of lubricating oil; at least one hydraulic tube which connects the sub-oil sump and the hydraulic circuit; and transfer means which transfers, via the hydraulic tube, the lubricating oil at least from one to the other of the sub-oil sump and the hydraulic circuit.

BRIEF DESCRIPTION OF THE DRAWINGS

Embodiments of the present invention will be described below with reference to the drawings.

DESCRIPTION OF THE PREFERRED EMBODIMENTS

The oil circulation control unit will be described below with reference to the embodiments applied to a car engine lubricating apparatus. However, the application of this lubricating apparatus is not limited to car engines alone. It may also be applied to internal combustion engines of airplanes or the like.

Figure 1:
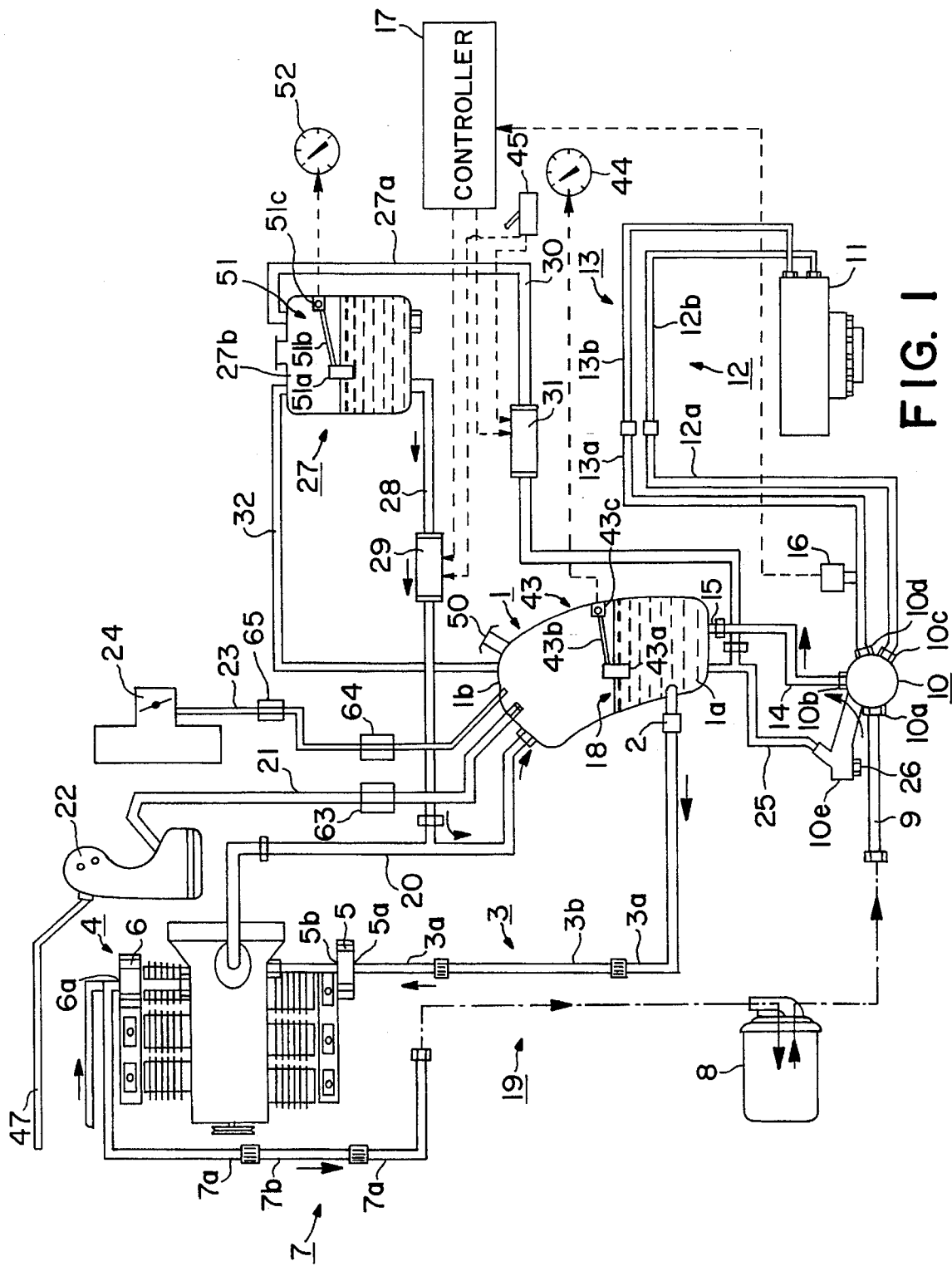
FIG. 1 is a diagrammatic view of an oil circulation control unit embodying the present invention, in which the thermostat is shown in a closed state.
Figure 2:
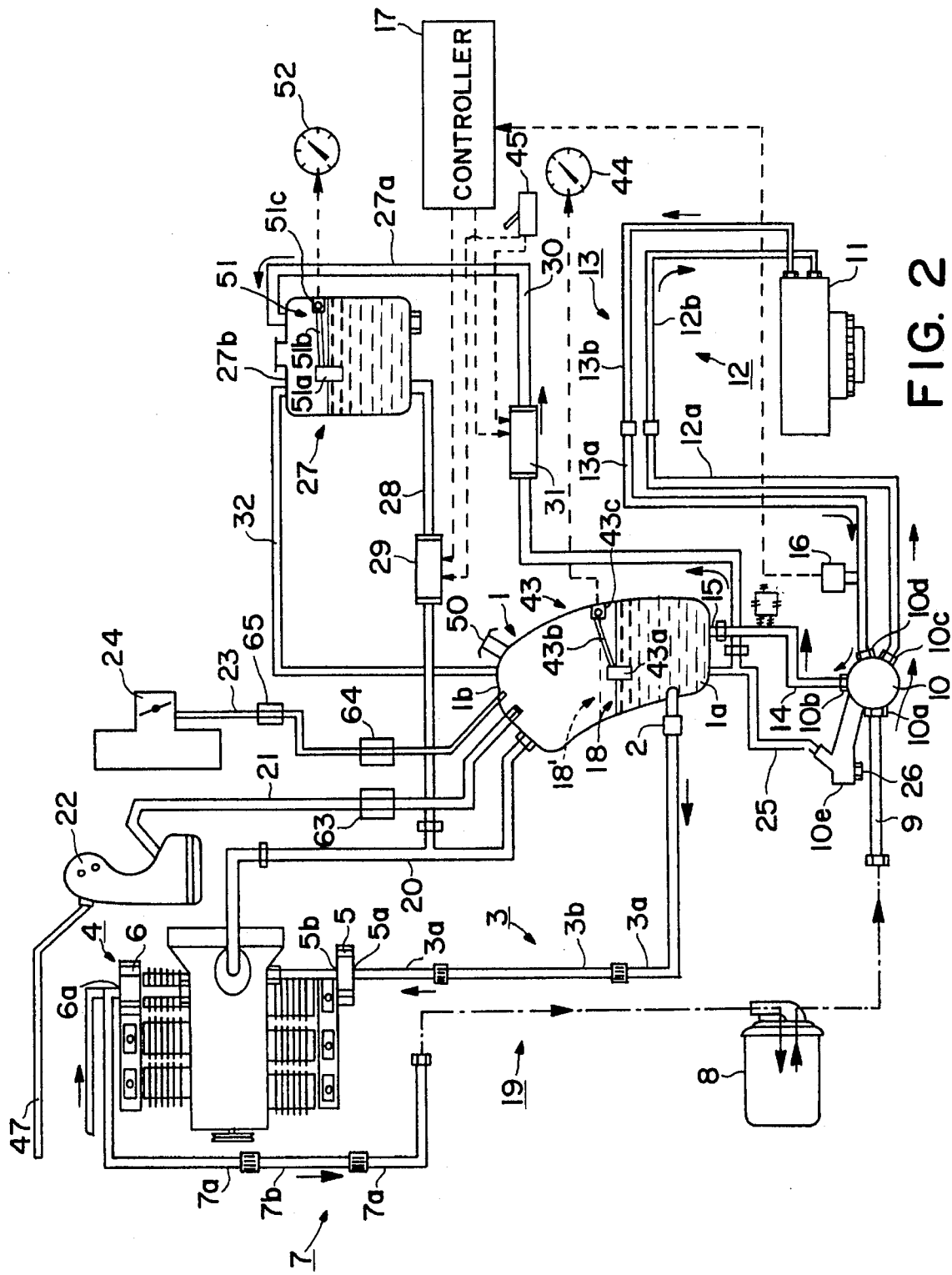
FIG. 2 is the embodiment of FIG. 1, in which the thermostat is shown in an open state.

FIG. 1 illustrates an embodiment of this invention in which the flow of the lubricating oil is at an optimum temperature or below. A thermostat 10 of a lubricating circuit 19 operates such that a lubricating oil inlet 10a and a lubricating oil outlet 10b communicate with each other. On the other hand, FIG. 2 illustrates the flow of the lubricating oil at a temperature higher than the optimum temperature, with the thermostat 10 operating such that the lubricating oil flows through a bypass to an oil cooler 11. Hereafter, the operating states of the thermostat, shown in FIGS. 1 and 2, respectively, will also be called the closed and the open states of the thermostat, respectively.

In FIG. 1, the oil circulation control unit (o.c.c.u.) of the embodiment is used for supplying lubricating oil to the sliding parts of a car engine. The o.c.c.u has an oil tank 1 for collecting lubricating oil. The oil tank 1 has an outlet tube 2 mounted at its bottom 1a, to which is connected a hydraulic tube 3 such as a metallic tube 3a, a flexible hose 3b, or the like. The other end of the hydraulic tube 3 is connected to a suction mouth 5a of an oil pump 5 which is driven by the driving power of the engine 4 crankshaft or cam shaft.

The oil tank 1 also has an oil level gauge 43 for detecting the oil level. The oil level gauge 43, as illustrated in FIG. 1, has a float 43a, a lever 43b and a sensor section 43c. The float 43a mounted to the front end of the lever 43b moves up and down in accordance with the oil level 18 of the oil tank, and electrical signals coming from the sensor section 43c are sent in accordance with the rotating position of the lever 43b to an oil meter 44 provided in the car's interior. This allows the operator to be able to read the present oil level 18.

Figure 4:
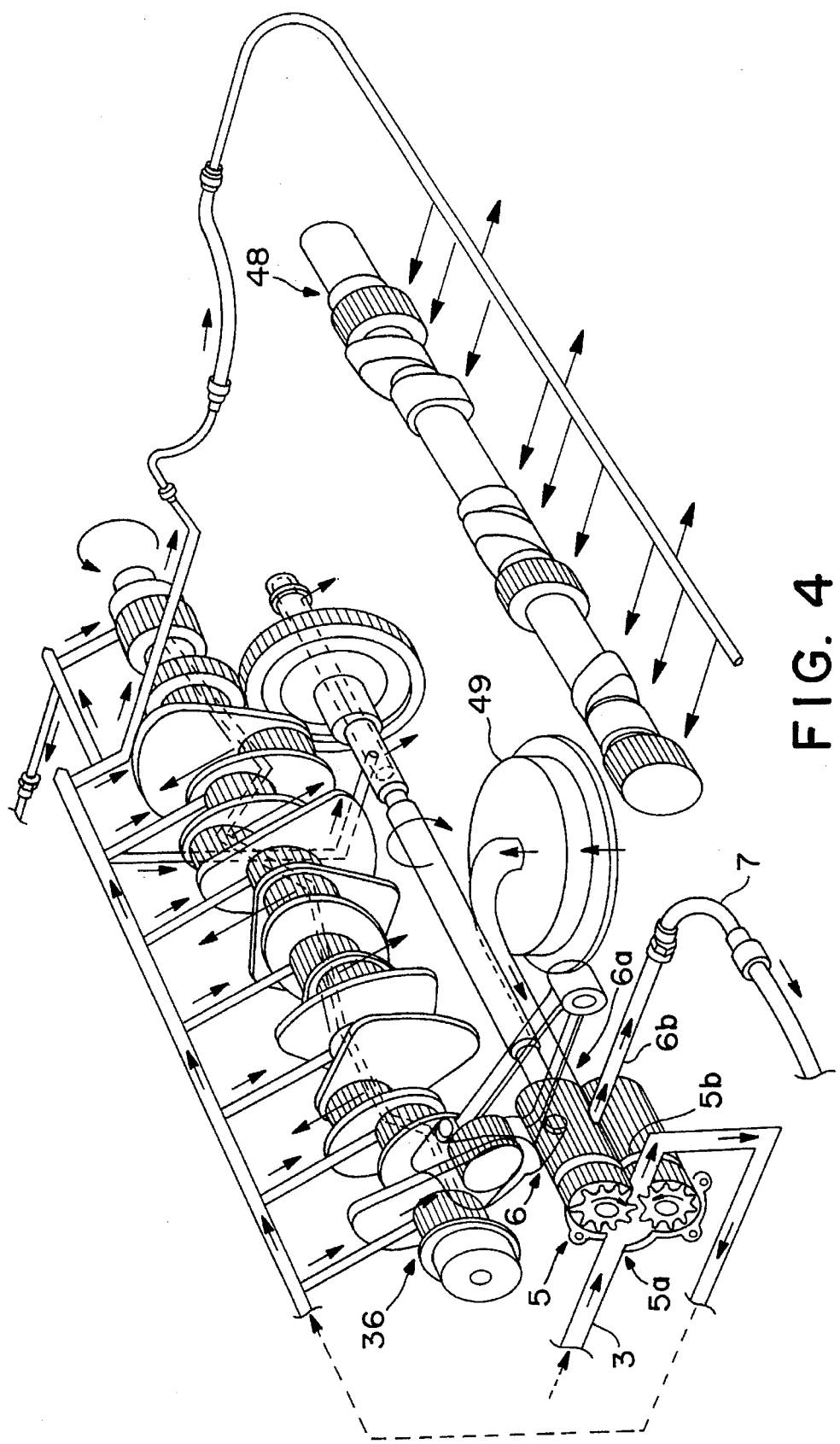
FIG. 4 is a perspective view of the details of the oil pumps and parts of the engine.

In the oil circulation control unit of the embodiment, the oil pump 5 may be a gear pump, shown in FIG. 4, or a trochoid pump. The trochoid pump has, for example, an inner rotor which has four vanes and an outer rotor which has five recesses. The inner rotor is driven by the crankshaft, and rotation of the inner rotor in turn causes the outer rotor to rotate. However, since there is a difference between the number of vanes of the inner rotor and the number of recesses of the outer rotor, the outer rotor rotates at four-fifths the speed of the inner rotor. This means that there is progressive shift in the position of the space formed there between and the volume of the space. When the volume of the space is increased, the pressure within the space is decreased, with the result that oil is sucked in from the suction mouth 5a of the oil pump 5. On the other hand, when the volume thereof is decreased, the pressure within the space is increased, with the result that oil is discharged from an outlet 5b of the oil pump 5 to increase the pressure therein.

As shown in FIG. 4, the lubricating oil which has been pumped up by the oil pump 5 flows from the outlet 5b of the oil pump 5 through many oil supplying paths which are formed at an engine cylinder block, a cylinder head, a crank shaft 36, and the like, and is then ejected onto a piston, a cylinder, a crank shaft 36, a connecting rod, a cam shaft 48, bearings, and other parts which slide against one another and rotate.

When ejected onto each of the foregoing parts, the lubricating oil forms a film on the sliding portions, which reduces frictional forces and prevents rapid wearing of the sliding parts. The lubricating oil also cools parts which have become hot due to frictional heat, and cylinders and pistons which have become hot due to combustion. Furthermore, the oil absorbs forces added to the sliding parts, helping to reduce noise. Further, the lubricating oil fills the gap between the piston or piston ring and the cylinder; prevents internal leakage of gas in the cylinder; washes away foreign matter, such as metallic powder, which is produced in the engine; and forms a film covering for the metallic surfaces, which serves to prevent rust prevention.

The lubricating oil flows through many oil circulation paths formed in the engine 4 cylinder block, the cylinder head, etc., or flows along the wall surface of the crankcase and then is allowed to drop naturally, after which it is cooled in the recovering sump 49 provided at the bottom surface of the crankcase (See FIG. 4). Since the recovering sump 49 of the embodiment returns the lubricating oil back to the oil tank after recovering the used lubricating oil, a problem does not arise even when a small amount of air is sucked in. Accordingly, a sump which is smaller in volume than the oil pan can be used in the usual wet sump type lubricating apparatus.

Figure 9:
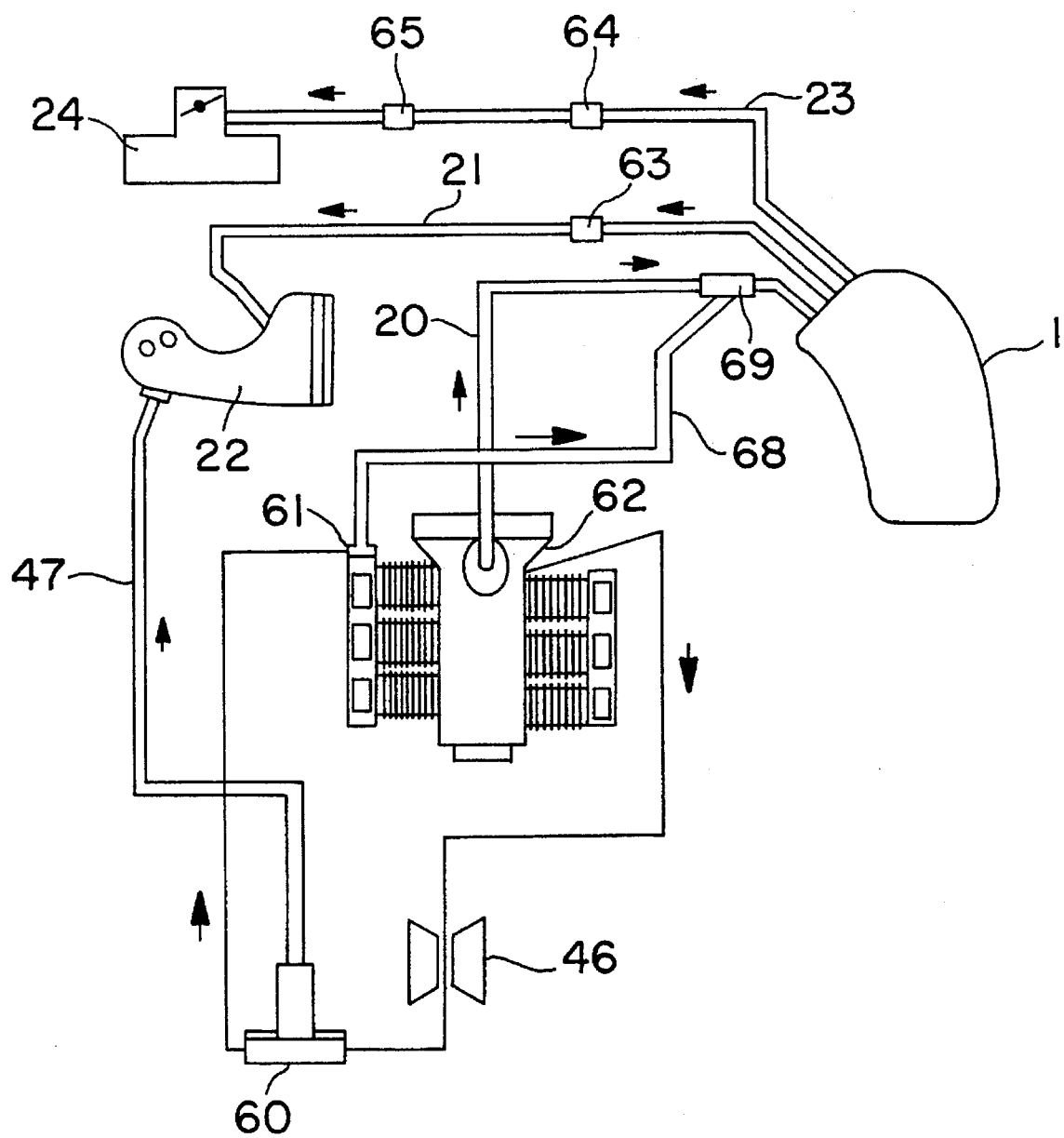
FIG. 9 is a diagrammatic view of a turbo charger oil circulation system.

In an engine having a turbo charger 46, as shown in FIG. 9, the lubricating oil which has been pumped up by the oil pump 5 (FIG. 1) is also ejected through a return valve 62 onto the turbo charger 46. A recovering sump 60 is also separately provided to recover the lubricating oil which has been ejected onto the turbo charger 46. A suction oil pump 61, driven separately from the oil pump 5 by the crankshaft 36, is separately provided. The lubricating oil collected in the recovering sump 60 is returned to the oil tank 1 through pipes 68 and 20, attached by connecting means 69. In an engine having the turbo charger 46, the lubricating oil is susceptible to greater damage because high-temperature (700° C.) exhaust gas is conducted to the turbo charger 46 and the rotors thereof rotate at about 200,000 rpm. The oil circulation control of the present invention, however, allows a fresh supply of lubricating oil to be circulated to the hydraulic circuit 19 to accommodate this situation.

The lubricating oil, collected by the recovering sump 49 (See FIG. 4), is circulated by an oil pump 6, having a structure similar to the oil pump 5, after which it passes through an oil filter 8, shown in FIGS. 1 and 2, via a hydraulic oil pipe 7, such as a metallic pipe 7a, a flexible hose 7b, or the like, connected to the outlet 6b (see FIG. 4) of the oil pump 6. The oil pumps 5 and 6 employed in the embodiment, shown in FIG. 4, are both driven by the crankshaft 36 in a ganged fashion although they have separate pump chambers. The oil filter 8 may be of a type either having various fibers superimposed upon one another or having thin metal plates superimposed upon one another. It removes from the lubricating oil foreign matter which is produced in the engine, hydraulic pipe, etc. The oil filter 8 does not have to be mounted at places illustrated in the Figures. It may be provided in the hydraulic circuit, between the oil tank 1 and the oil pump 5, or directly following the oil pump 5. It is preferable to use both filter types for diesel engines because of the carbon often produced by these engines.

As shown in FIGS. 1 and 2, a hydraulic pipe 9 has one end connected to the outlet of the oil filter 8, and the other end connected to the inlet 10a of the thermostat 10. In general, an optimum temperature for the lubricating oil is about 85° C. When the lubricating oil is heated by the cylinder and the piston to a temperature exceeding 125° C., its lubricating capability drops drastically. For this reason, in high output engines used for high-speed and long-hour driving and diesel engines, whose cylinders and pistons become very hot, an oil cooler 11 is provided to cool the high temperature lubricating oil down to the suitable temperature.

The thermostat 10 includes a change-over valve for automatic adjustment of the lubricating oil temperature. Depending on the temperature of the lubricating oil entering into the inlet 10a of the thermostat, the oil is either allowed to flow to the oil cooler 11 or to flow without being sent to the oil cooler 11. Any suitable thermostat may be used; and, since such thermostats are well known to those with skill in the art, no details of the thermostat have been described.

The thermostat 10 has a lubricating oil outlet 10b, an outlet 10c from which the oil flows to the oil cooler, and an inlet 10d into which the oil flows from the oil cooler. When the lubricating oil has a temperature below a predetermined temperature (for example, 85° C.), the change-over valve functions in such a way that the lubricating oil inlet 10a and the lubricating oil outlet 10b are connected with each other, and the outlet is blocked so that oil flowing through the thermostat bypasses the oil cooler 11. When the lubricating oil has a temperature exceeding the predetermined temperature, the change-over valve functions so that the lubricating oil inlet 10a and the outlet 10c are connected, outlet 10b is blocked, and the oil flows to the oil cooler. The oil flows from the thermostat to the cooler from outlet 10c into hydraulic pipes 12, which may comprise a metallic pipe 12a and a flexible hose 12b, or the like. The oil flows from the oil cooler 11 to the inlet 10d of the thermostat through hydraulic pipes 13, comprising a metal pipe 13a and a flexible hose 13b or the like. In the present embodiment, either an air-cooled or water-cooled oil cooler may be used. When a water-cooled type oil cooler is used, the cooling water or fluid for the engine can also be employed as the coolant.

This, in a car incorporating the oil circulation control of the present invention, even with the addition of the oil cooler, adjustments to the oil level can be made to minimize oil level changes without need to stop the car. Accordingly, an oil cooler having a relatively high cooling capacity can be installed.

This also gives rise to the following advantages. In air-cooled and oil-cooled type engines, the lubricating oil plays an important role in cooling the engine. In general, greater engine displacement causes greater heat generation and, hence, requires greater cooling capacity for cooling the lubricating oil. Here, when the oil cooler capacity is increased, there is a larger change in the oil level in the oil tank between the state in which the thermostat has been opened and the state in which the same has been closed. In addition, when the amount of oil circulation in the hydraulic circuit is increased, it must be taken into consideration that time is required for warming up the engine when starting the car. However, all of the above-described problems are overcome by using the oil circulation control unit of the present invention because, even when a high capacity oil cooler is used, the oil tank level can be maintained at the same level when the thermostat is opened as when it is closed. In particular, if the amount of oil circulating in the hydraulic circuit is kept at a minimum required, only a short warming-up time is required to increase the temperature of the cold oil to the optimum temperature of 85° C. In the past, with an oil cooler having a capacity of about 3.9 liters (the total capacity of the oil cooler and the hydraulic oil pipe), only an engine having a displacement of not larger than 4000 cc could be used. Using the present invention, with an oil cooler with increased capacity to about 8 liters, air-cooled and oil-cooled engines having a displacement exceeding 5000 cc can now be installed in automobiles. They may be horizontally-opposed type engines or V-type engines, including multiple cylinder engines having 8, 10, 12, or more cylinders.

Referring again to FIGS. 1 and 2, the lubricating oil outlet 10b, formed in the thermostat 10, is connected to one end of a hydraulic pipe 14. The other end of the hydraulic pipe 14 is connected to an inlet pipe 15 connected to the bottom 1a of the oil tank 1.

An oil pressure sensor 16 is provided on hydraulic pipe 13, and serves to detect and output the oil pressure information of the hydraulic pipe 13 to a controller 17. The oil pressure sensor 16 is provided to detect whether the thermostat 10 is open or closed. That is, when the thermostat 10 is open and the lubricating oil circulates in the bypass to the oil cooler 11, the oil pressure developed by the oil pump 6 is exerted upon the oil pressure sensor 16. In contrast, when the thermostat 10 is closed, only the oil pressure remaining in the oil cooler 11 bypass is exerted on the oil pressure sensor 16. Thus, there is less oil pressure as compared to when the thermostat is open. Using the differences between the pressure of the oil flowing through the hydraulic pipe 13 when the thermostat 10 is open and when it is closed, the operating condition of the thermostat 10, as well as the oil level 18 of the oil tank 1, may be detected from the output of the oil pressure sensor 16. While it is preferable to mount the oil pressure sensor 16 on the hydraulic pipe 13, it may be mounted on the hydraulic pipe 12.

In the oil circulation control unit of the present invention, the oil level 18 of the oil tank can be detected, not only by the use of the oil pressure sensor 16 provided on the hydraulic pipe 13, but also by the use of an oil level gauge 43 provided within the oil tank 1. The operating condition of the thermostat 10 (whether the thermostat is opened or closed), for example, can be detected by the use of a suitable mechanical means.

A pipe 20, illustrated in FIGS. 1 and 9, serves to conduct blowby gas (which may leak from a gap between an engine cylinder and piston of the engine 4 into the crankcase) back to the oil tank 1. Similarly, a pipe 21 is connected to the oil tank 1. The pipe has an orifice 63 and serves to conduct blowby gas from the oil tank to an air filter 22. Also connected to the oil tank 1 is a tube 23, which has an orifice 64 and a return valve 65. The tube 23 is also connected to a throttle valve 24 and serves to conduct the blowby gas back to the engine cylinder through the throttle valve 24 when the engine is idling. Tube 23 also serves to prevent freezing of the throttle valve 24 by conducting hot blowby gas to the throttle valve 24. The pipes 20, 21, and 23 are all connected to a top face 1b of the oil tank 1. A pipe 47, illustrated in FIG. 9, serves to conduct the blowby gas from the recovering sump 60 back to the air filter 22.

A hydraulic pipe 25, connected to the bottom 1a of the oil tank 1, is a drain pipe to remove lubricating oil in the oil tank 1. In the present embodiment, the other end of the drain pipe is connected to a bracket 10e of the thermostat 10, and is stoppered by a drain plug 26.

In the oil circulation control of the present embodiment, a sub-oil tank 27 is provided, in addition to the above-described oil tank 1. The sub-oil tank 27 is utilized for supplying additional lubricating oil when the oil level 18 decreases in oil tank 1 due to the consumption of the lubricating oil which flows through the hydraulic circuit 19. The sub-oil tank 27 is also used for removing the lubricating oil from the hydraulic circuit 19, such as when too much lubricating oil flows through the hydraulic circuit 19. The capacity of the sub-oil tank 27 may vary depending on the particular use. In the oil circulation control of the present embodiment, the total capacity of the oil tank 1 and the hydraulic circuit 19 combined is 14 liters, while the capacity of the sub-tank 27 is 3.5 liters.

In the embodiment, illustrated in FIG. 1, only one sub-tank is mounted to supply and remove the lubricating oil. However, two or more sub-tanks may be used, in which sub-tanks for supplying lubricating oil and those for removing lubricating oil are separately provided. In racing cars and other vehicles which move at high speeds, the lubricating oil is consumed rapidly. Therefore, a sub-oil tank may be provided to periodically remove a fixed amount of lubricating oil which flows in the hydraulic circuit together with a second sub-tank to supply the necessary amount of replacement lubricating oil to the hydraulic circuit. This allows the oil level of the oil tank or the total quantity of the oil in the circuit to be maintained at a constant volume, and the lubricating oil, flowing in the hydraulic circuit, to be constantly refreshed.

As shown in FIG. 1, the sub-oil tank 27 has an oil level gauge 51 to detect the level of the oil. This oil level gauge 51 comprises a float 51a, a lever 51b, and a sensor section 51c. The float 51a mounted to the front end of the lever 51b moves up and down in accordance with the oil level in the sub-oil tank. The location of the float lever is sensed by the sensor section 51c, which electrically signals an oil meter 52 provided in the car. This allows the car operator to be able to read and monitor the oil level at all times.

In addition, as shown in FIG. 1, a hydraulic pipe 28 such as a metal pipe or a flexible hose has one end connected to a bottom 27a of the sub-oil tank, with the other end of the hydraulic pipe 28 connected to the blowby pipe 20. A motor-driven oil pump 29 is provided on the hydraulic pipe 28 to send by pressure lubricating oil in the sub-oil tank 27. When the oil pump 29 operates, the lubricating oil in the sub-oil tank 27 is conducted to the blowby gas pipe 20 via the hydraulic pipe 28, from where it is supplied to the oil tank 1. In supplying oil in the sub-oil tank 27 to the oil tank 1, however, the hydraulic pipe 28 may be connected to an oil supply port 50, so that the blowby gas pipe 20 does not have to be used.

On the other hand, a hydraulic pipe 30, such as a metal pipe or a flexible hose, is connected to a top surface 27b of the sub-oil tank 27, with the other end of the hydraulic pipe 30 connected to the drain pipe 25. A motor-driven pump 31 is provided on the hydraulic pipe 30 to send by pressure the lubricating oil in the drain pipe 25 into the sub-oil tank 27. When the pump 31 operates, the lubricating oil in the drain pipe 25 (which is oil from the oil tank 1) is conducted into the sub-oil tank 27 via the hydraulic pipe 30. To return the oil from oil tank 1 back to the sub-oil tank 27, however, the hydraulic pipe 30 may be connected directly to the oil tank 1, so that the drain pipe 25 does not have to be used.

In the embodiment of FIGS. 1 and 2, motor-driven oil pumps 29 and 31 were used as means to send the lubricating oil in the oil tank 1 to the sub-oil tank 27, and vice versa. However, the present invention is not particularly limited to the use of motor-driven oil pumps. Hydraulic pumps which utilize the driving power of the engine or the like may also be used. However, such pumps require a clutch to control the starting and stopping of the pump. Accordingly, it is preferable to use a motor-driven pump which operates by electrical power supplied from car batteries or alternators.

The motor-driven oil pumps 29 and 31, for example, can be operated by a manual switch 45 while observing an oil meter 44, which is installed in the car's interior and reads the level of oil in Tank 1. Alternatively, the pumps 29 and 31 may be operated automatically by means of the above-described oil level gauge 43 and the oil pressure sensor 16.

In the present embodiment, when the oil level of the tank 1 rises and falls as a result of the opening and closing of the thermostat 10, the oil pressure sensor 16 is used to automatically operate the motor-driven oil pumps 29, 31. When the oil level changes due to other reasons, the operator operates the manual switch 45 while observing the oil meter 44, which is installed in the car's interior, to supply and remove the oil.

More particularly, as shown in FIGS. 1 and 2, information regarding oil pressure coming from sensor 16 is sent to an input portion of a controller 17, after which this information is memory by a comparing portion of the controller 17. Preferably, upper and lower limits for the standard oil pressure value are input in the memory of the controller 17. When the oil pressure value, detected by the oil pressure sensor 16, is larger than the upper limit of the standard oil pressure value, the thermostat 10 opens and judges that the oil level 18 of the oil tank 1 is higher than the regular oil level. Then, a timer or the like measures a predetermined time, after which an operation command signal is sent to the oil pump 31 to remove lubricating oil from the drain pipe 25 and send it to the sub-oil tank 27. On the other hand, when the oil pressure value, detected by the oil pressure sensor 16, is less than the standard oil pressure value, the thermostat 10 closes and judges that the oil level 18 of the oil tank 1 has dropped below the regular oil level. Then, a timer or the like measures a predetermined time, after which an operation command signal is sent to the oil pump 29 to supply lubricating oil from the sub-oil tank 27 to the oil tank 1 via the hydraulic pipe 28.

Changes in the oil level due to the opening and closing of the thermostat 10 occur when the temperature of the lubricating oil rises above the operating temperature of the thermostat (which is usually in the range of from 70° C. to 95° C., although it depends on the engine), and it is not infrequent that the car operator fails to recognize changes in oil level. Accordingly, in the present embodiment, the structure of the control unit is such that changes in the oil level caused by the opening and closing of the thermostat 10 are automatically controlled by a control unit. However, the structure may be such as to allow the car operator to manually control changes in the oil level caused by the opening and closing of the thermostat 10, while observing the oil meter 44. Electronic circuits inside the controller 17 used for the above-described storing and comparing of information will not be described in detail, since they can easily be constructed by those skilled in the art using commercially available electronic parts.

Using the oil meter 44, the operator can determine if the oil level 18 of the oil tank 1 is too high or too low and then use the manual switch 45 to operate the motor-driven oil pumps 29 and 31 and supply lubricating oil to the sub-oil tank 27 from the hydraulic circuit 19. In particular, since the oil level in the oil tank 1 rises and falls in accordance with the number of rotations of the engine, the total amount of oil flowing through the hydraulic circuit changes due to expansion of the hose or the like. This leads to large changes in the oil level. Accordingly, it may not be preferable to detect a change in the oil tank level alone and supply or remove lubricating oil only by automatic control. To overcome such a problem, the oil circulation control unit of the embodiment allows oil to be supplied or removed by manual operation.

Figure 5:
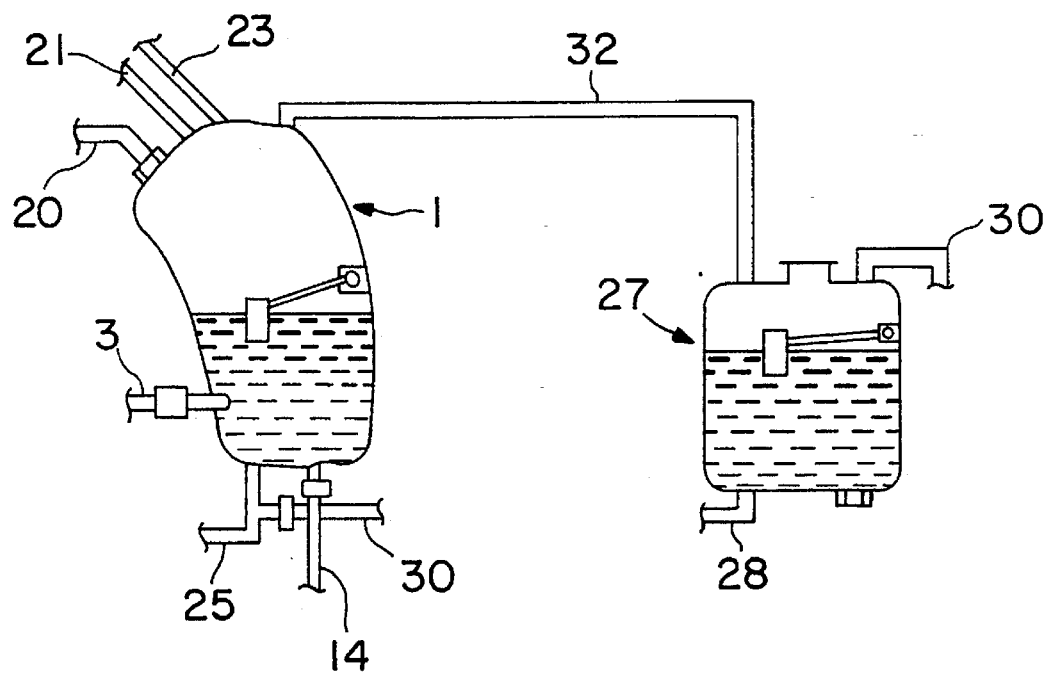
FIG. 5 is a diagrammatic view of a modification of a part of the embodiment shown in FIGS. 1 and 2.

A hydraulic pipe 32, illustrated in FIG. 1, links the top surface 27b of the sub-oil tank 27 to the top surface 1b of the oil tank 1. When lubricating oil overflows from either one of the oil tanks 1 and 27, the pipe 32 conducts this overflow oil to the other oil tank. Overflow of lubricating oil is a problem, particularly, for the oil tank 1. To prevent overflow of lubricating oil from the oil tank 1, as shown for example in FIG. 5, the sub-oil tank 27 is installed in the car below the oil tank 1.

Figure 6:
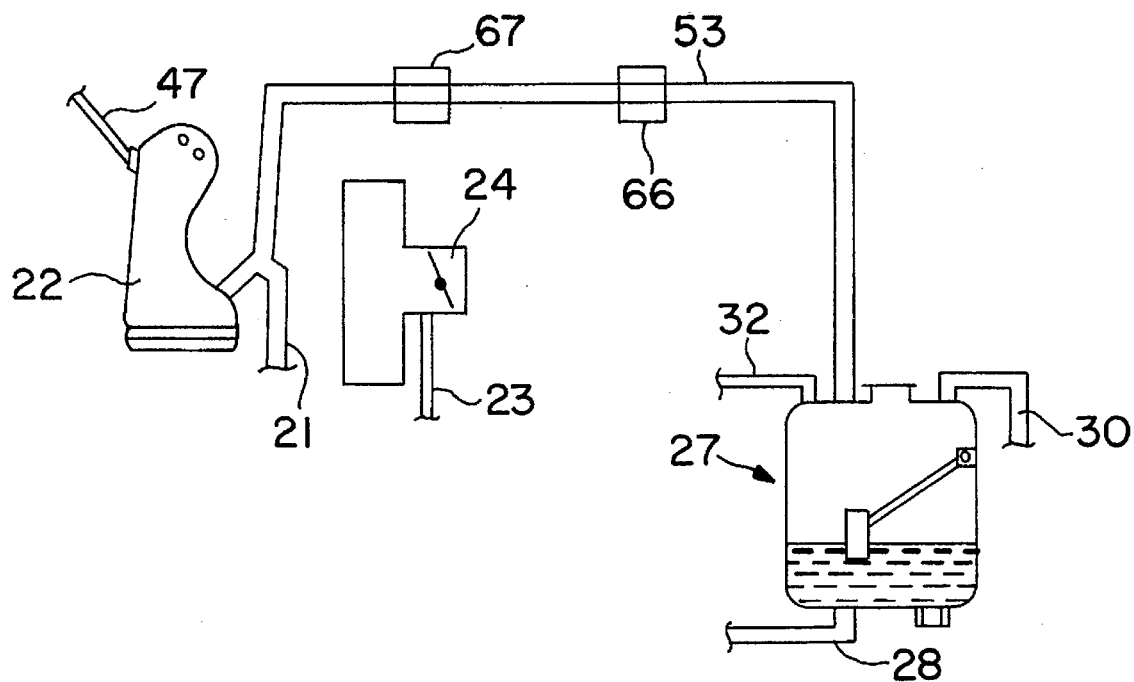
FIG. 6 is a diagrammatic view of a modification of another part of the embodiment shown in FIGS. 1 and 2.

As shown in FIG. 6, a pipe 53 having an orifice 66 and a return valve 67 may be provided to return the blowby gas, which has entered into the sub-oil tank 27, back to pipe 21 and filter 22. Here, a pipe may also be provided to return the blowby gas back to the throttle valve 24 or the pipe 47. The pipe 53 is particularly effective when the sub-oil tank 27 is virtually empty. Since oil which circulates in the hydraulic circuit 19 contains blowby gas, removal of this oil into the sub-oil tank 27 introduces blowby gas into the sub-oil tank. When there is a very small amount of oil in the sub-oil tank 27, the blowby gas introduced therein will fill the entire sub-oil tank 27. Therefore, it is preferable to return the blowby gas, which has been introduced into the sub-oil tank 27, back to the pipe 21.

Referring to FIG. 1, a closed thermostat occurs, for example, directly after the engine is started, during slow driving for a short period of time, or when the lubricating oil is cooled by an extremely low ambient air temperature. In contrast, an opened thermostat occurs (FIG. 2), for example, when the vehicle is driven at a high speed for a long time, or when the engine is almost overheated by an extremely high ambient air temperature. An opened thermostat may result even when the vehicle is moving at a low speed, when the ambient temperature is high and the driving time long. In any case, when the lubricating oil, conducted to the inlet 10a of the thermostat, has a higher temperature than the appropriate temperature (generally 85° C.), the valve in the thermostat 10 is automatically switched to conduct the lubricating oil, circulating in the hydraulic circuit 19, to the cooling oil bypass. The oil cooler 11 of the cooling bypass causes heat transfer between the lubricating oil and the cooling air (cooling water when a water-cooled type oil cooler is used), with the result that the lubricating oil is cooled in accordance with the cooling capacity of the oil cooler 11.

In the present embodiment, when the thermostat 10 is in a closed state (FIG. 1), the amount of lubricating oil for the engine 4 is optimally adjusted, that is, the oil level 18 of the oil tank 1 is adjusted. In general, the amount of lubricating oil is adjusted, while the thermostat 10 is open. However, when the amount of lubricating oil is adjusted while the thermostat 10 is closed, as shown in FIG. 1, rapid wearing and seizing of sliding parts of the engine can be prevented, for example, when the car is driven at a high speed through a low temperature region. In other words, assume that the amount of lubricating oil is adjusted in the conventional way while the thermostat 10 is open, and that the car has moved at a speed of 60 km/hr. When the car then enters a highway such as an autobahn and moves through a low temperature region at a speed of about 250 km/hr for a long time, the oil is cooled by the temperature of the environment, causing the thermostat to stop the lubricating oil from passing through the oil cooler bypass. This decreases the total amount of oil circulation, despite the increase in the amount of oil consumed due to high-speed driving. As a result, the sliding parts may be worn and seized. However, if the amount of lubricating oil is adjusted while the thermostat is closed, wearing and seizure of the sliding parts will be avoided even when the amount of circulating oil decreases, since the right amount of oil is provided for the engine.

In either case, when the thermostat is closed, as shown in FIG. 1, or when the thermostat is open, as shown in FIG. 2, more lubricating oil is consumed at high car speeds, for example, of more than 160 km/hr, as compared to normal car speeds of about 60 km/hr, even when the same distance is covered in each case. For example, when the car drives a distance of 2000 km at a speed of 60 km/hr, about one liter of lubricating oil is consumed for the first 1000 km, and about 1.4 liters for the remaining 1000 km. However, when the car drives such distance at a speed of 160 km/hr, about 1.5 liters of oil is consumed for the first 1000 km, and 1.7 liters for the remaining 1000 km. When the speed increases to 210 km/hr, about two liters is consumed for the first 1000 km, and about 2.3 liters for the remaining 1000 km.

Accordingly, for example, when cars are driven in various motor sports races, typical examples being the LeMans 24-hour race, the Daytona 24-hour race, and the Formula car race, oil should preferably be supplied during the race. Similarly, when cars are driven for a long time on highways such as autobahns in Germany, a large amount of lubricating oil is consumed such that it is necessary to stop the car and supply lubricating oil.

In the car having installed therein the oil circulation control unit of the present invention, a drop in the oil level 18 of the oil tank 1 is detected with the oil level gauge 43, and the detected information is indicated on the oil meter 44 in the car's interior. Then, the manual switch 45 is operated by the car driver to energize the motor-driven oil pump 29, which then supplies lubricating oil, contained in the sub-oil tank 27, via the hydraulic pipe 28 to oil tank 1. Thus, irrespective of whether control is performed manually by an operator, or whether control is performed automatically by a control unit, the oil level 18 of the oil tank 1 is maintained at the correct level and deficiency of lubricating oil due to its consumption will not occur. This, in turn, prevents rapid wearing and seizing of the engine sliding parts. The detection of the oil level 18 should preferably be performed while the engine is in an idling state, because when the engine speed is increased, the rubber tubes in the hydraulic circuit will expand as a result of the increased oil pressure and this will in turn cause the oil level to fall.

The rate of expansion of the lubricating oil differs slightly depending on the type of oil, but all types expand and contract due to temperature changes. For example, right after the car is started, the lubricating oil is at a low temperature, so that its level in the oil tank is lower compared to when it is at a higher temperature. This means that when the amount of oil supplied to the engine is adjusted at the optimum temperature of, for example, 85° C., there is an oil deficiency right after the car has been started. Even in such a case, the oil circulation control unit of the present invention is highly effective.

The lubricating oil in the sub-oil tank 27 may be of the same type as that which circulates through the hydraulic circuit 19. However, a different type of lubricating oil may be contained in the sub-oil tank 27 and appropriately supplied to the hydraulic circuit 19 in accordance with how much the lubricating oil has been consumed.

The common types of lubricating oil used comprise base oil with various additives. Useful base oil types for high-performance cars include mineral oil and synthetic oil, with synthetic oil having excellent viscosity temperature characteristics and heat stability as compared to mineral oil. Useful additives to be added to the base oil include oxidation inhibitors for inhibiting oxidation of the lubricating oil; extreme pressure additives and friction modifiers for minimizing rapid wearing as much as possible to prevent lubricating failure, even when load increases; viscosity index improvers for reducing viscosity for low temperature region driving and minimizing reduced viscosity even for high temperature region driving; and detergents-dispersants for preventing carburetor, throttle valve, and PCV (Positive Crankcase Ventilation) clogging.

Such types of base oil and additives are mixed in a suitable ratio to prepare lubricating oil having an initial viscosity in accordance with the purpose for which it is used. However, as the circulation time of the lubricating oil increases, the oil is diluted with fuel, thereby decreasing its viscosity. In addition, as the lubricating oil is used, the molecules of the base oil and the additives experience a shearing force, which results in decreased molecular weight; and, it is believed, consequent reduction of the viscosity of the lubricating oil.

For example, in the LeMans 24-hour race and the Daytona 24-hour race, which are considered as the most severe of the endurance races, the so-called rate of oil dilution with fuel reaches 15%, so that even when lubricating oil having an initial kinematic viscosity of 17 to 18 cSt at 100° C. [SAE (Society of Automotive Engineering) 50] is used, the kinematic viscosity drops to 9 cSt (at 100° C.), which is the same viscosity as SAE 30 lubricating oil.

Accordingly, raising the initial viscosity of the lubricating oil or the like may be a possible solution to overcome the problems of dilution with fuel and reduced molecular weight when the car moves at a high speed for a long time. But, this is not preferable because this leads to output loss of the engine.

Using the oil circulation control unit of the present invention overcomes the problem of reduced viscosity of oil which arises as the driving time is increased. Lubricating oil with optimal initial viscosity with respect to engine output can be put in the oil tank 1, and lubricating oil, suitably prepared can be supplied from the sub-oil tank 27 to the oil tank 1 when the viscosity of the lubricating oil is reduced as the car continues to move. For example, commonly used high-grade synthetic lubricating engine oil has a base oil-:additive mixture ratio of ±80%:±20%. Lubricating engine oil prepared by increasing the additive to give, for example, a mixture ratio of base oil:additive of ±30%:±70% may be provided in the sub-oil tank. Thus, when oil is consumed, the oil supplied from the sub-oil tank 27 will replace loss of additives. In addition, to counter dilution with fuel, lubricating oil having increased base oil viscosity may be supplied from the sub-oil tank. For example, SAE 65 oil is used in the sub-oil tank when the lubricating engine oil in the main tank 1 is SAE 40.

Accordingly, the present invention permits lubricating oil of a type different from that circulating in the hydraulic circuit 19 to be provided in the sub-oil tank 27 to supply an optimal amount thereof to the hydraulic circuit 19. This prevents changes in the various characteristics of the lubricating oil which circulates in the hydraulic circuit 19.

Figure 7:
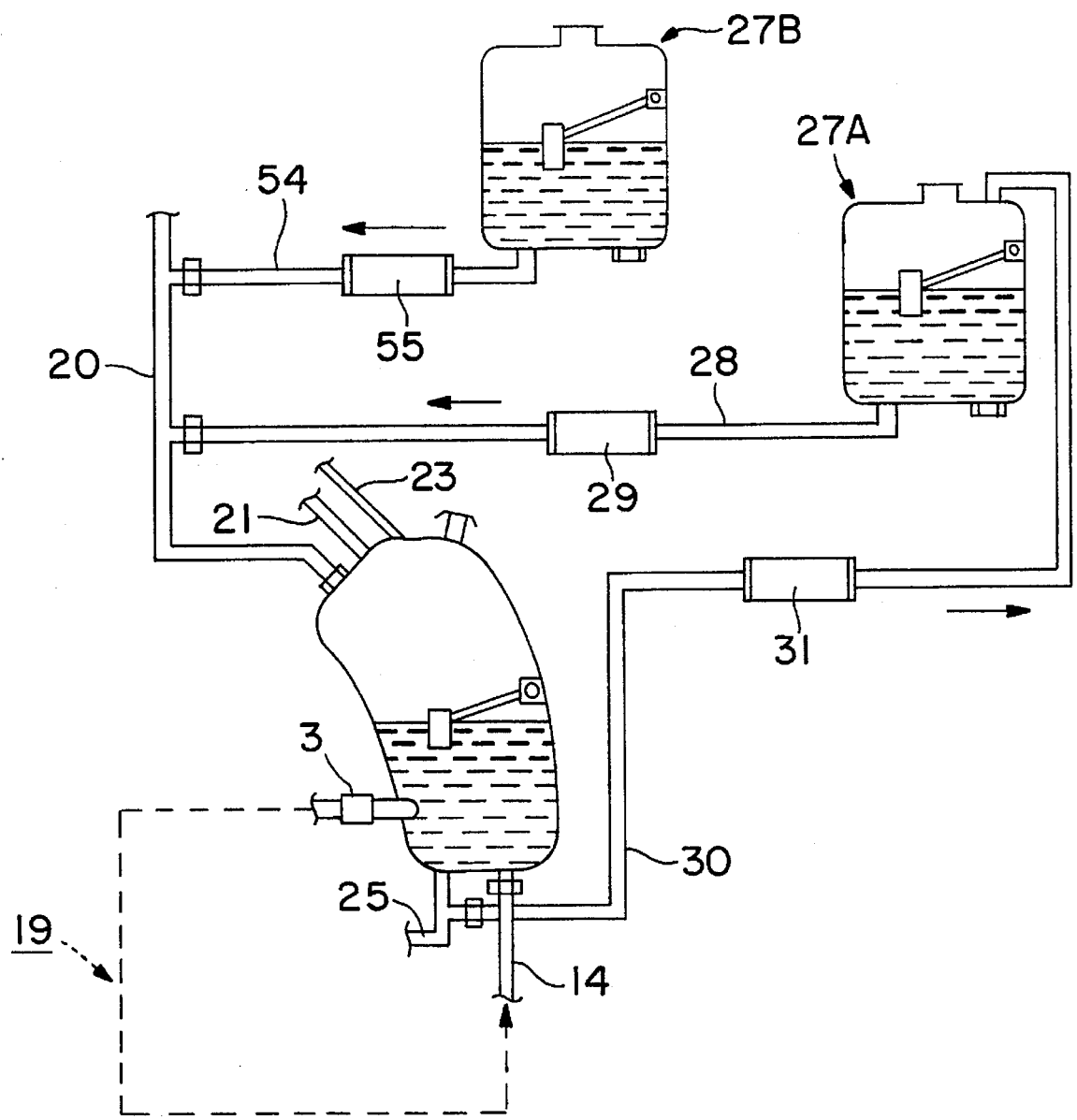
FIG. 7 is a diagrammatic view of a modification of another part of the embodiment shown in FIGS. 1 and 2.

Obviously, lubricating oil of a different type contained in the sub-oil tank 27 is not fit for use when the amount of lubricating oil is reduced merely by oil leakage and the like. Therefore, when it is necessary to be able to supply both the same and different types of lubricating oil in the same vehicle, a plurality of sub-oil tanks are provided, each of which may be designed for the purpose for which it is used. For example, as shown in FIG. 7, two sub-oil tanks 27A and 27B are provided. The sub-oil tank 27B is filled with lubricating oil which is different in type to that flowing through the hydraulic circuit 19, while the sub-oil tank 27A is filled with the same type of lubricating oil as that flowing through the hydraulic circuit 19. Thus, when there has been merely a decrease or increase in the amount of oil without dilution or chemical change, the same type of lubricating oil is supplied to the sub-oil tank 27A or removed therefrom. On the other hand, when there has been a change in the viscosity of the lubricating oil flowing through the hydraulic circuit 19, a different type of lubricating oil may be supplied to the hydraulic circuit 19 from oil tank 27B. A hydraulic pipe and an oil pump to remove lubricating oil from the hydraulic circuit is unnecessary in this design. It is sufficient to install the hydraulic pipe 54 and the oil pump 55 to supply lubricating oil from the sub-oil tank 27B to the oil tank 1.

The control unit has been described with its thermostat closed, as illustrated in FIG. 1. It will now be described with its thermostat in an open state as illustrated in FIG. 2. Lubricating oil, which has passed through an oil filter 8, is conducted toward the oil cooler 11 by the thermostat 10, after which it is cooled by the cooler. Then, it returns to the thermostat 10, and finally returns to the oil tank 1. Accordingly, when the thermostat is in an open state, the hydraulic circuit 19 is increased in length in an amount equivalent to the length of the cooling bypass, as compared to that when the thermostat is in a closed state. This means that there is an increase in the amount of lubricating oil which circulates in the hydraulic circuit 19. As a result, when the thermostat 10 is closed, the oil level 18 of the oil tank 1 rises to oil level 18' shown by the dotted lines of FIG. 2, so that there is too much lubricating oil. In such a case, the motor-driven oil pump 31 is operated and the lubricating oil is removed from the drain pipe 25 of the oil tank to the sub-oil tank 27 via the hydraulic pipe 30. The motor-driven oil pump 31 can be operated in either of the following ways: by taking in information regarding oil pressure from the oil pressure sensor 16 and automatically controlling the controller 17, or by an operator who manually operates the motor-driven oil pump 31 while looking at the oil meter 44. However, in general, it is extremely difficult for the operator to detect the opening and closing of the thermostat while looking at the oil meter. Consequently, in the present embodiment, changes in the oil level 18 of the oil tank which accompany the opening and closing operations of the thermostat 10 are automatically detected by using the oil pressure sensor 16.

As described above, when the thermostat 10 is in an open state, the lubricating oil, flowing in the hydraulic circuit 19, is removed to the sub-oil tank 27. When the thermostat 10 is closed or when lubricating oil has been consumed, lubricating oil is supplied to the hydraulic circuit 19 from the sub-oil tank 27 when the oil level 18 of the oil tank 1 has dropped.

In this way, according to the oil circulation control unit of the present invention, even when the oil level of the oil tank changes due to the addition of an oil cooler, it can be maintained at a constant level. Accordingly, an optimal type of lubricating oil for the operation of the engine can be supplied in an optimal amount. In addition, since the oil level of the oil tank is kept at a fixed level even when an oil cooler is added, a large oil cooler or that having high cooling capacity can be provided in the car.

Particularly in air-cooled and oil-cooled type engines, lubricating oil plays an important part in cooling the engine. Therefore, the larger the displacement of the car engine, the larger the capacity of the oil cooler required. If the oil circulation control unit of the present invention is used, the oil level of the oil tank can be maintained at the same level when the thermostat is open as when it is closed, even when an oil cooler of large capacity is employed. Heretofore, with an oil cooler of a capacity of only about 3.9 liters (the total capacity of the oil cooler and the hydraulic oil pipe), only an engine having a displacement of not larger than about 4000 cc could be used. In contrast, with the invention capacity of the oil cooler can be increased to about 8 liters so that engines having a displacement exceeding 5000 cc can be used. Such engines may be horizontally-opposed-type engines or V-type engines with 8, 10, 12, or more cylinders. Here, if the amount of oil circulation in the hydraulic circuit is kept to a minimum, the temperature of the cold oil will be increased to the optimal temperature (which is usually in the range of from 70° C. to 95° C., though depending on the engine) in a short time to warm and start the engine. The application of the oil circulation control unit of the present invention is not limited to the above-described air-cooled type or oil-cooled type engine. It may be applied to any type of air-cooled type engine, water-cooled type engine, or the like.

According to the present invention, since an increase in the oil level of the oil tank can be prevented, spattering of oil onto the spark plugs can be prevented. As a result, a cold-type spark plug having better heat radiation capacity and resistance to overheating can be used in the engine, thereby further increasing the output of the engine. When the cold-type spark plug is used, ignition failure caused by oil spattering is infrequent. Therefore, for low-speed driving, it is preferable to intentionally reduce the oil level 18 of the oil tank and the total quantity of the oil in the hydraulic circuit by operating the manual switch 45.

In addition, according to the present invention, the oil level 18 of the oil tank 1 can be prevented from rising, which prevents oil from overflowing from the oil tank 1 to the throttle valve 24 or oil filter 22.

The above-described embodiment is one in which the oil circulation control unit of the present invention is applied to the so-called dry-sump type lubricating apparatus. However, the oil circulation control unit of the present invention may also be applied to the so-called wet-sump-type lubricating apparatus.

Figure 3:
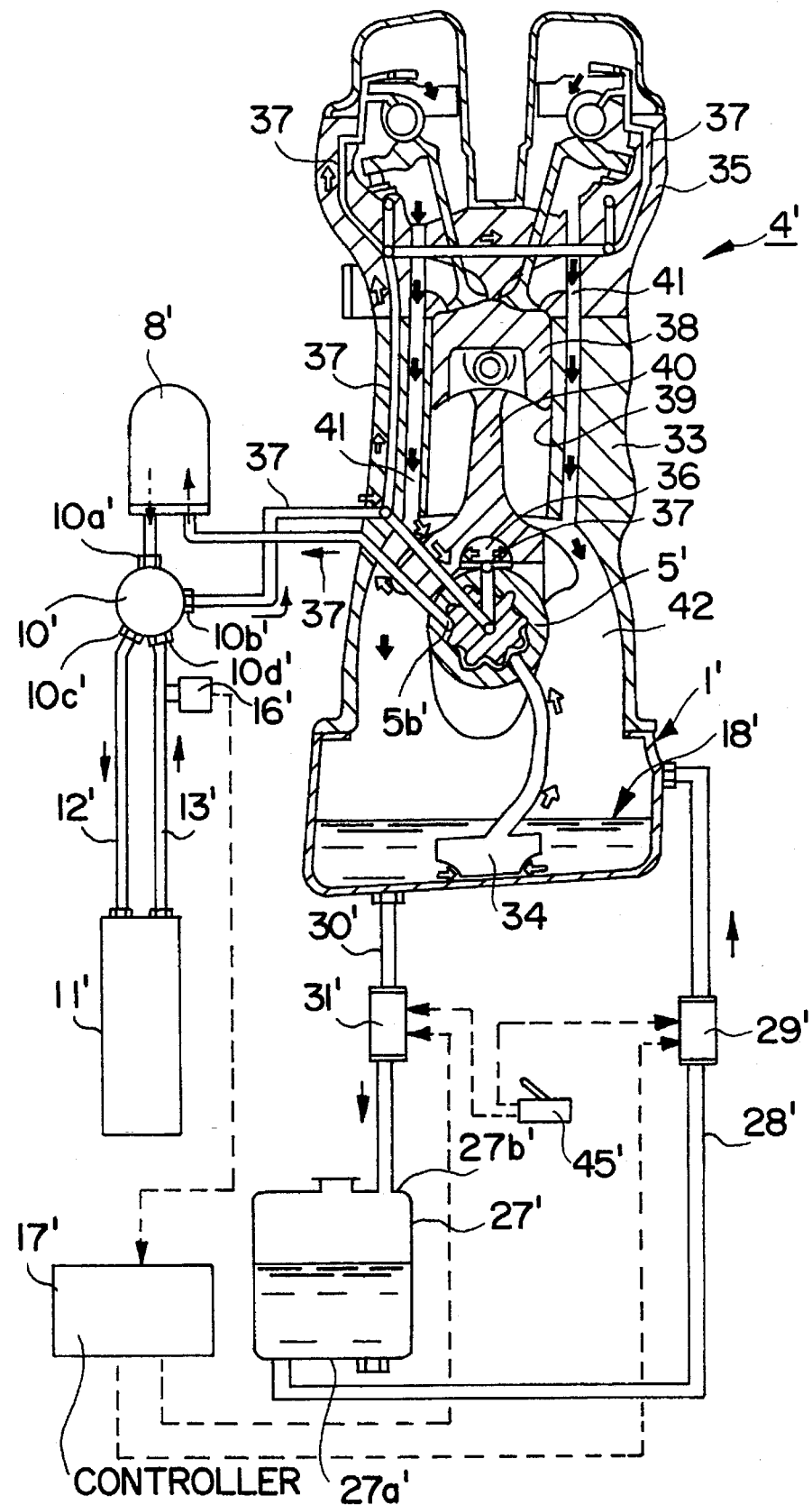
FIG. 3 is a diagrammatic view of an alternative embodiment of the present invention.

FIG. 3 is an embodiment in which the present invention is applied to the wet-sump-type lubricating apparatus. Compared with the dry-sump-type lubricating apparatus illustrated in FIG. 1, the wet-sump-type lubricating apparatus illustrated in FIG. 3 does not have an oil tank which is provided separately from the engine. An oil pan 1' mounted to the bottom surface of the cylinder block 33 serves as the oil tank 1 illustrated in FIG. 1 and the recovery sump. The oil pan 1' is so constructed as being exposed at the lower surface of the car body; this construction allowing the lubricating oil contained in the oil pan 1' to be cooled. In the embodiment, however, there is further provided an oil cooler 11' to cool the lubricating oil. In addition, there are provided a hydraulic pipe 12' for leading the lubricating oil into the oil cooler 11' and a hydraulic pipe 13' for returning the lubricating oil from the oil cooler 11' back to the hydraulic circuit. Further, there is provided a thermostat 10', which is used to select, in accordance with the temperature of the oil circulating in the hydraulic circuit, whether or not the lubricating oil will flow to the oil cooler 11' An oil pressure sensor 16', provided on the above-described hydraulic pipe 13', serves to detect oil pressure in the hydraulic pipe 13' and to provide oil pressure information to the controller 17'. When an oil cooler is installed in the wet-sump-type lubricating apparatus, the oil circulation of the hydraulic circuit can be set at a required minimum, which thereby reduces warm-up time necessary to increase the temperature of the oil.

The remainder of the construction is similar to the dry-sump-type lubricating apparatus of FIG. 1. Suction force of an oil pump 5', including a trochoid pump and a gear pump, causes the lubricating oil, contained in the oil pan 1', to be sucked up through the oil strainer 34. The lubricating oil, which has been sucked up by the oil pump 5', passes from a discharge opening 5b' of the oil pump 5' to an oil filter 8'. Then, it passes through a plurality of oil supplying paths 37 formed in the engine cylinder block 33, cylinder head 35, crank shaft 36, and the like. Afterwards, it is ejected on parts which slide against one another and rotate, including a piston 38, a cylinder 39, a crankshaft 36, a connecting rod 40, and a bearing. The lubricating oil, ejected on each of the parts, then passes through a plurality of oil returning paths 41 formed in such parts as a cylinder head 35 and cylinder block 33 of the engine, after which it flows along the wall of a crankshaft 42 and falls naturally onto the oil pan 1'. This is the construction of the hydraulic circuit of the wet-sump-type lubricating apparatus. When the thermostat 10' is open, the lubricating oil, pumped up by the oil pump 5', flows to the oil cooler 11' from the thermostat 10' via the hydraulic pipe 12'. The lubricating oil is cooled by oil cooler 11' and is then returned back to the thermostat 10', from where it is sent to the oil supplying path 37.

In the oil circulation control unit of the present embodiment, there is also provided, in addition to the above-described oil pan 1', a sub-oil tank 27' The sub-oil tank 27' is used for supplying lubricating oil, for example, when the lubricating oil flowing in the hydraulic circuit has been consumed. It is also used for removing lubricating oil flowing in the hydraulic circuit, which has raised the oil level in the oil pan 18'. Accordingly, the capacity of the sub-oil tank 27' is not particularly limited. It is preferably selected according to the intended use.

Figure 8:
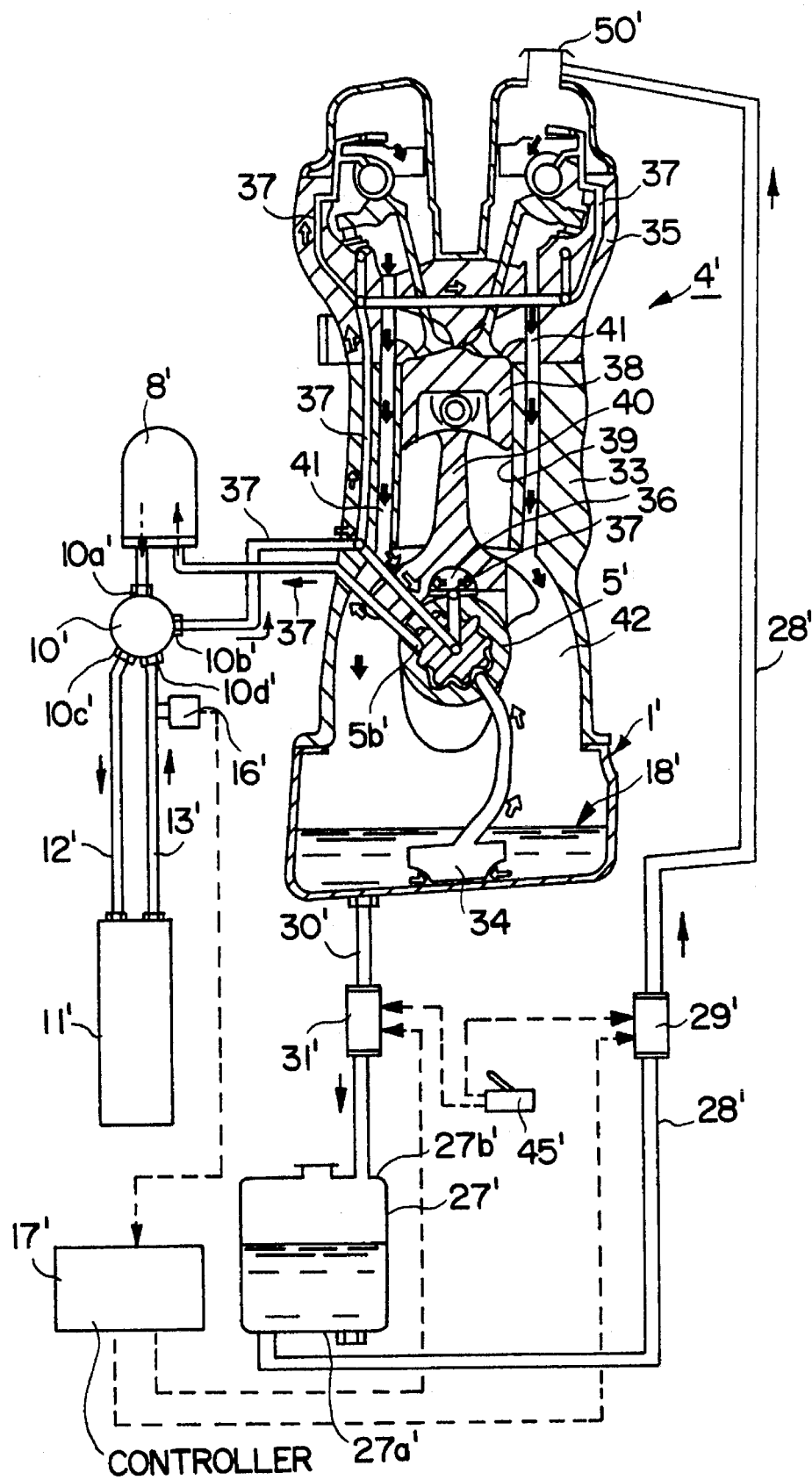
FIG. 8 is a diagrammatic view of another alternative embodiment of the present invention.

As shown in FIG. 3, a hydraulic pipe 28' such as a metallic pipe and a flexible hose is connected to the bottom 27a' of the sub-oil tank 27', with the other end of the hydraulic pipe 28' connected to a side wall of the oil pan 1'. In addition, the hydraulic pipe 28' may also be connected, for example as shown FIG. 8, to an oil supply port 50'. A motor-driven oil pump 29' is provided on the hydraulic pipe 28'. When the motor-driven oil pump 29' operates, the lubricating oil in the sub-oil tank 27' flows by pressure through the hydraulic pipe 28' and is supplied to the oil pan 1'.

A hydraulic pipe 30' such as a metallic pipe and a flexible hose, is connected to the top 27b' of the sub-oil tank 27', with the other end of the hydraulic pipe 30' connected to the bottom of the oil pan 1'. A motor driven oil pump 31' is provided on the hydraulic pipe 30' to send by pressure lubricating oil in the oil pan 1' into the sub-oil tank 27'. When the motor-driven oil pump 31' operates, the lubricating oil in the oil pan 1' flows through the hydraulic pipe 30' and is returned to the sub-oil tank 27'.

In the embodiment of FIG. 3, the motor-driven oil pumps 29' and 31' were used as means to transfer lubricating oil contained in oil pan 1' to sub-oil tank 27' and vice versa. However, in the present invention, the transfer means is not limited to motor-driven oil pumps. There may also be used a hydraulic pump which operates due to the driving power of the engine and the like. The motor-driven oil pumps 29' and 31' can be operated or stopped in either of two ways. In a first way, for example, an oil level gauge is provided at the oil pan 1' to allow detection of the oil level 18' in the oil pan. The detected oil level is indicated on an oil meter provided in the car's interior. While looking at this oil meter, the operator operates a manual switch 45', provided in the car's interior, to start or stop the motor-driven oil pumps 29' and 31'. In a second way, when there is a rise or fall in the oil level 18' caused by the opening or closing of the thermostat 10', the above-described oil pressure sensor 16' can be used to automatically start or stop the motor-driven oil pumps 29' and 31'.

In FIG. 3 and the above-described embodiment, the oil circulation control unit of the present invention has been applied to a car having a wet-sump-type lubricating apparatus and an oil cooler. However, the oil circulation control unit of the invention can also be applied to cars having a wet-sump-type lubricating apparatus which does not contain an oil cooler.

The oil circulation control unit of the present invention may be used for the same purposes whether it is applied to cars employing a wet sump type lubricating apparatus or the above-described dry-sump-type lubricating apparatus. It can be used for supplying lubricating oil when the lubricating oil has been consumed or when thermal contraction has occurred; for supplying or removing lubricating oil when a change in oil level has occurred due to an opening or closing of the thermostat; or for supplying additives to prevent deterioration of the lubricating oil performance, or the like.

In this way, the oil circulation control unit of the present invention allows an optimal amount of lubricating oil to be maintained for the hydraulic circuit, which prevents each of the sliding parts of the engine from being worn and seized, ignition failure, or the like. This is true whether it is used in a dry sump type lubricating apparatus or a wet sump type apparatus, or whether or not there is an oil cooler. In addition, the car operator will not have to worry about dirtying his hands when supplying and removing lubricating oil.

The present invention has been described with reference to preferable embodiments. However, those skilled in the art will recognize that various modifications can be made within the spirit and scope of the appended claims.

What is claimed is:

1. A control unit for circulating lubricating oil to vehicle engine parts comprising:
   (a) a main oil sump for collecting said lubricating oil;
   (b) a hydraulic circuit for supplying the oil to the engine parts and returning the oil to the main oil sump;
   (c) an oil pump provided in the hydraulic circuit for circulating the oil therein;
   (d) at least one sub-oil sump which is capable of holding an optimum amount of lubricating oil;
   (e) at least one hydraulic tube which connects the sub-oil sump and the hydraulic circuit;
   (f) means for transferring the oil from the sub-oil sump to the hydraulic circuit and from the hydraulic circuit to the sub-oil sump;
   (g) means for cooling the lubricating oil;
   (h) a cooling bypass for diverting the lubricating oil from the hydraulic circuit to the oil cooling means and for transferring the oil from the cooling means to the hydraulic circuit;
   (i) a thermostat for regulating the path of the lubricating oil in accordance with its temperature, said thermostat having a first position where the oil circulates only through the hydraulic circuit and a second position where the lubricating oil circulates through the hydraulic circuit and cooling bypass;
   (j) means for detecting the pressure of the lubricating oil flowing through the cooling bypass; and,
   (k) means for controlling the transfer means in response to changes in the pressure of the lubricating oil detected by the pressure detecting means.

2. A control unit according to claim 1, wherein the controlling means comprises means responsive to said means for detecting the pressure of the lubricating oil in the cooling bypass for supplying information to the transfer means to cause it to regulate the oil pressure in the cooling bypass within a predetermined range.

3. A control unit according to claim 1 further comprising:
   (a) means for detecting the amount of lubricating oil in the hydraulic circuit; and
   (b) control means for supplying information to the transfer means to direct the flow of oil to or from the hydraulic circuit.

4. A control unit according to claim 3 further comprising:

(a) means for determining whether the amount of lubricating oil in the hydraulic circuit is within a predetermined optimum range, said determining means providing information to the transfer means, said transfer means being responsive to the information to regulate the amount of oil in the hydraulic circuit.

5. A control unit according to claim 3 wherein said main oil sump comprises an oil tank separate from the engine.

6. A control unit according to claim 3, wherein the main oil sump comprises an oil pan mounted to the engine.

7. A control unit according to claim 5, wherein the sub-oil tank contains lubricating oil of a type different from that circulating through the hydraulic circuit.

8. A control unit according to claim 7, wherein the oil in the sub-oil tank has a higher ratio of oil additives to base oil than the oil circulating in the hydraulic circuit.

9. A control unit according to claim 6, wherein the sub-oil tank contains lubricating oil of a type different from that circulating through the hydraulic circuit.

10. A control unit according to claim 9, wherein the oil in the sub-oil tank has a higher ratio of oil additives to base oil than the oil circulating in the hydraulic circuit.

* * * * *

UNITED STATES PATENT AND TRADEMARK OFFICE
CERTIFICATE OF CORRECTION

PATENT NO. : 5,568,842  
APPLICATION NO. : 08/300463  
DATED : October 29, 1996  
INVENTOR(S) : Akemasa Otani Page 1 of 1

It is certified that error appears in the above-identified patent and that said Letters Patent is hereby corrected as shown below:

On Title Page

Item - 76 - Inventor: delete "Akesama" and replace with --Akemasa--.

Column 5, lines 15-16, delete "crankshaft 36" and replace with --camshaft 48--;

Column 12, line 9, delete "50" and replace with --70--; and

Column 14, line 21, delete "oil" and replace with --air--.

Signed and Sealed this

Seventeenth Day of April, 2007

JON W. DUDAS  
*Director of the United States Patent and Trademark Office*